(12) United States Patent
Albri

(10) Patent No.: US 12,358,117 B2
(45) Date of Patent: Jul. 15, 2025

(54) ELECTRICAL, PISTOL-LIKE HANDHELD TOOL

(71) Applicant: Steinel GmbH, Herzebrock-Clarholz (DE)

(72) Inventor: Frank Albri, Herzebrock-Clarholz (DE)

(73) Assignee: Steinel GmbH, Herzebrock-Clarholz (DE)

( * ) Notice: Subject to any disclaimer, the term of this patent is extended or adjusted under 35 U.S.C. 154(b) by 1035 days.

(21) Appl. No.: 17/423,458

(22) PCT Filed: Jun. 23, 2020

(86) PCT No.: PCT/EP2020/067535
§ 371 (c)(1),
(2) Date: Jul. 15, 2021

(87) PCT Pub. No.: WO2021/063553
PCT Pub. Date: Apr. 8, 2021

(65) Prior Publication Data
US 2022/0118597 A1    Apr. 21, 2022

(30) Foreign Application Priority Data
Oct. 1, 2019 (DE) .................. 10 2019 126 493.6

(51) Int. Cl.
*B25F 5/02* (2006.01)
*B23B 45/00* (2006.01)
(Continued)

(52) U.S. Cl.
CPC ............. *B25F 5/02* (2013.01); *B23B 45/001* (2013.01); *F24H 3/0423* (2013.01); *H01H 13/08* (2013.01)

(58) Field of Classification Search
None
See application file for complete search history.

(56) References Cited

U.S. PATENT DOCUMENTS 3,781,579 A * 12/1973 Rosenthal, Jr. ........ H01H 13/08
200/318.1
4,296,290 A 10/1981 Peot
(Continued)

FOREIGN PATENT DOCUMENTS

CN    1674182 A    9/2005
CN  101027166 A    8/2007
(Continued)

OTHER PUBLICATIONS

DE-102015226801-A1 (Wiker Juergen) Jun. 29, 2017 [retrieved on Mar. 25, 2025]. Retrieved from Espacenet Database, translation by EPO and Google. (Year: 2025).*
(Continued)

*Primary Examiner* — John J Norton
*Assistant Examiner* — Franklin Jefferson Wang
(74) *Attorney, Agent, or Firm* — Bachman & LaPointe, P.C.

(57) ABSTRACT

The invention relates to an electrical, pistol-like handheld tool. The handheld tool includes a tool body for electrically activated machining of a workpiece, a grip part connected to the tool body at an angle thereto, an actuation device for manually activating and/or deactivating the handheld tool, which actuation device is arranged on the tool body or the grip part, and an unlocking device for manually unlocking and/or locking the actuation device. The unlocking device is arranged on the tool body or the grip part such that unlocking is effected by the handheld tool being supported in stable equilibrium on one of the fingers of a user's hand when the grip part is gripped by a user.

15 Claims, 6 Drawing Sheets

(51) Int. Cl.
*F24H 3/04* (2022.01)
*H01H 13/08* (2006.01)

(56) References Cited

U.S. PATENT DOCUMENTS

| | | | |
|---|---|---|---|
| 5,195,164 A * | 3/1993 | Lambert | F24H 3/0423 |
| | | | 200/318.2 |
| 6,812,425 B1 | 11/2004 | Wong | |
| 6,989,503 B2 | 1/2006 | Wong | |
| 10,418,879 B2 * | 9/2019 | Bartoszek | H02K 7/145 |
| 2005/0042051 A1 | 2/2005 | Obermeier et al. | |
| 2005/0205406 A1 | 9/2005 | Wong | |
| 2014/0133898 A1 | 5/2014 | Tussing | |
| 2024/0139931 A1 * | 5/2024 | Hoelscher | B25F 5/00 |

FOREIGN PATENT DOCUMENTS

| | | | | |
|---|---|---|---|---|
| CN | 108266388 A | | 7/2018 | |
| DE | 8714271 U1 | | 12/1987 | |
| DE | 102006060880 A1 | | 6/2008 | |
| DE | 102012223931 A1 | * | 6/2014 | B25F 5/02 |
| DE | 102016012204 A1 | | 4/2017 | |
| DE | 102015225723 A1 | | 6/2017 | |
| DE | 102015226801 A1 | * | 6/2017 | |
| EP | 0048124 A2 | | 3/1982 | |
| EP | 2884515 A1 | | 6/2015 | |
| JP | 2008080421 A | | 4/2008 | |

OTHER PUBLICATIONS

International search report for patent application No. PCT/EP2020/067535 dated Sep. 3, 2020.
Chinese Office Action dated Jan. 16, 2024 for corresponding application CN 202080046648.6.

* cited by examiner

ELECTRICAL, PISTOL-LIKE HANDHELD TOOL

BACKGROUND OF THE INVENTION

The invention relates to an electrical, pistol-like handheld tool, in particular, a battery-operated, pistol-like handheld tool.

Electrical, pistol-like handheld tools, in particular, battery-operated, pistol-like handheld tools, have a large number of uses in manual work. An electrical, pistol-like handheld tool can, for example, be used as a cordless screwdriver, drill, hammer drill, or even as a drill bit. Another use for electrical, pistol-like handheld tools, or, in particular, battery-operated, pistol-like handheld tools, is the use as a hot air fan, which is also called a hot gun or heat gun. Still another use is the use of the electrical, pistol-like handheld tool as a hot glue gun. All these electrical, pistol-like handheld tools mentioned have in common that they have a tool body for the electrically activated machining of a workpiece (mechanically or with hot air) and a grip part which is connected at an angle to the tool body like a pistol.

The shaping of such a handheld tool in the form of a pistol enables workpieces to be machined ergonomically and effortlessly. In a battery-operated pistol-like handheld tool, an electrical battery module is usually detachably attached to the underside of the grip part in order to supply the handheld tool with electrical energy. Due to the arrangement of the electrical battery module on the underside of the grip part, the grip part, due to the non-negligible weight of the battery module, usually points downward in a plumb manner with its grip axis when the handheld tool is gripped by a user. This is also supported by the fact that, during a work process, the electrical handheld tool is usually placed on the battery module so that the grip part with its grip part axis points along the direction of gravity.

Such an electrical, pistol-like handheld tool is usually activated and/or deactivated manually by means of an actuating device, with the actuating device, similar to a pistol, being provided as an actuation pushbutton in an area of the grip part, in which activation by an index finger of a user's hand can be done as if actuating a gun trigger. This intuitive type of operation of a pistol-like handheld tool is especially used for handheld tools in which quick activation/deactivation is to be achieved by the user. This is particularly advantageous in a battery-operated hot air fan, in which the power consumption can be reduced and thus the battery life can be increased by quick activation/deactivation of the hot air fan.

Especially with hot air guns, there is, however, the risk that the hot air fan is activated by unintentional actuation of the actuating device. Specifically in a delivery van or in a workshop, tipping over of such a handheld tool or falling over in a delivery van can, due to an activation of the hot air fan, lead to dangerous situations, as the operating temperature of hot air fans used manually can be up to 700° C. However, also in the case of motorized hand tools, unintentional actuation can lead to damage to the tool itself, its immediate surroundings or, at worst, personal injury.

Therefore, in the case of potentially dangerous pistol-like handheld tools, an unlocking device is usually provided together with an actuating device, with which the actuating device can be manually unlocked and/or locked.

Previous solutions provide for a switch to be actuated with the thumb, which is pressed in or pushed down in order to unlock the actuating device like an actuation pushbutton. Depending on the hand position and size of the user's hand, however, these are difficult to reach or can only be actuated by an uncomfortable hand position.

Often, by pressing the thumb on the unlocking switch during the whole operating process, the hand rest area on the opposite side is also subjected to pressure due to the provision of a counterforce, which is inconvenient during prolonged use. Many of the known mechanisms require a plurality of mechanical parts and thus also offer more space for potential errors. This also causes higher material, manufacturing and assembly costs.

SUMMARY OF THE INVENTION

The invention is therefore based on the object of providing an electrical, pistol-like handheld tool, in particular, a battery-operated handheld tool, which can be unlocked for a handheld tool operation in an ergonomic and simple manner.

This object is achieved by the electrical, pistol-like handheld tool as disclosed herein. Advantageous embodiments and further developments of the invention are also disclosed herein and stated in the sub-claims.

In accordance with the invention, an electrical, pistol-like handheld tool is provided, which comprises a tool body for the electrically activated machining of a workpiece, a grip part connected at an angle to the tool body, an actuating device for manually activating and/or deactivating the handheld tool, which actuating device is arranged on the tool body or the grip part, and an unlocking device for manually unlocking and/or locking the actuating device. The unlocking device is arranged on the tool body or the grip part such that unlocking is effected by supporting the handheld tool in a stable equilibrium on one of the fingers of a user's hand when a user grips the grip part.

Thus, according to the invention, a safety interlock is provided which enables the handheld tool to be used without additional effort and without a user making additional movements. At the same time, accidental switching on of the tool is prevented if it falls over or is possibly stored in a delivery van or in a storage room. The safety interlock is actuated in an axis that differs from the axis of movement of the actuating device or an on/off switch in order to make unintentional actuation of the actuating device or of the on/off switch as unlikely as possible. In addition, the electrical, pistol-like handheld tool according to the invention has the advantage that it can be optimally operated and unlocked when working with both the left and the right hand.

In an advantageous embodiment of the invention, the handheld tool further has a support mandrel, which projects from the finger grip area of the grip part forward, and includes the unlocking device on its underside, with unlocking being effected by supporting the support mandrel on one of the fingers of the user's hand.

In order to make it more difficult or to prevent the handheld tool from slipping from the unlocking finger, the support mandrel can be configured concave on its underside for an at least partially enclosing accommodation of the unlocking finger against the direction of gravity. Thus, during an unlocking process, the pistol-like handheld tool, which is balanced in a stable equilibrium on the unlocking finger, does not slip from the unlocking finger.

In order to achieve a simple design of the actuating device of the handheld tool, it is advantageous if the actuating device comprises an electrical actuation pushbutton, which is actuated by an activation force against a restoring force transversely to the grip axis of the grip part by one of the fingers of the user's hand.

In order to provide the unlocking device with a simple design similar to that of the actuating device, it is convenient if the unlocking device comprises an electrical unlocking pushbutton which is actuated by a supporting force against gravity along the grip axis of the grip part by one of the fingers of the user's hand.

According to a further development of the invention, it is, however, also advantageous if the actuating device comprises an actuation contact sensor which is actuated by a contact of the actuation contact sensor in a direction transverse to the grip axis of the grip part by one of the fingers of the user's hand.

In this process, the unlocking device can also conveniently comprise an unlocking contact sensor which is actuated by a contact of the unlocking contact sensor in a direction along the grip axis of the grip part by one of the fingers of the user's hand.

For a particularly simple, compact and robust construction of the handheld tool according to the invention, it is convenient if the unlocking device comprises a mechanical unlocking mechanism, which mechanically unlocks the actuating device by a supporting force against gravity along the grip axis of the grip part by one of the fingers of the user's hand.

In this process, the mechanical unlocking mechanism can conveniently include an unlocking rocker, which is held in a locking position by a return spring connected to its first end, with the second end of the unlocking rocker blocking actuation of the actuating device.

In this process, it is advantageous if the second end of the unlocking rocker is configured U-shaped, wherein, when unlocking, a button part of the actuating device is centrally guided within the U-shaped end of the unlocking rocker and, when locking, the button part strikes a locking element on the U-shaped end of the unlocking rocker.

To enable an operation as intuitive as possible of the electrical, pistol-like handheld tool, it is advantageous if the actuating device is provided on the grip part or the tool body such that actuation is effected by means of an index finger of the user's hand.

For a particularly simple implementation of the invention, especially if a support mandrel is provided on the front part of the grip part, it is advantageous if the unlocking device is provided on the grip part or the tool body such that unlocking is effected by means of a middle finger of the user's hand.

In accordance with the invention, the unlocking device and the actuating device are provided symmetrically on the grip part or the tool body such that unlocking and actuation can be carried out in the same manner by means of a user's right or left hand. Thus, in accordance with the invention, optimum work can be achieved both with the left and the right hand, without any disadvantage arising when changing hands. In addition, the tool is easy to operate and easy to unlock for right-handers and left-handers alike.

In a particularly advantageous embodiment as a battery-operated handheld tool, it is convenient if the grip part can, on its bottom end facing away from the tool body, be detachably connected to an electrical battery module for supplying the handheld device with electrical energy.

In particular, it is provided in accordance with the invention that the handheld tool is used as a hot gun, with the tool body including a hot air fan.

BRIEF DESCRIPTION OF THE DRAWINGS

The invention is explained in more detail in the following text, for example, based on the drawings in which.

DETAILED DESCRIPTION

Figure 1:
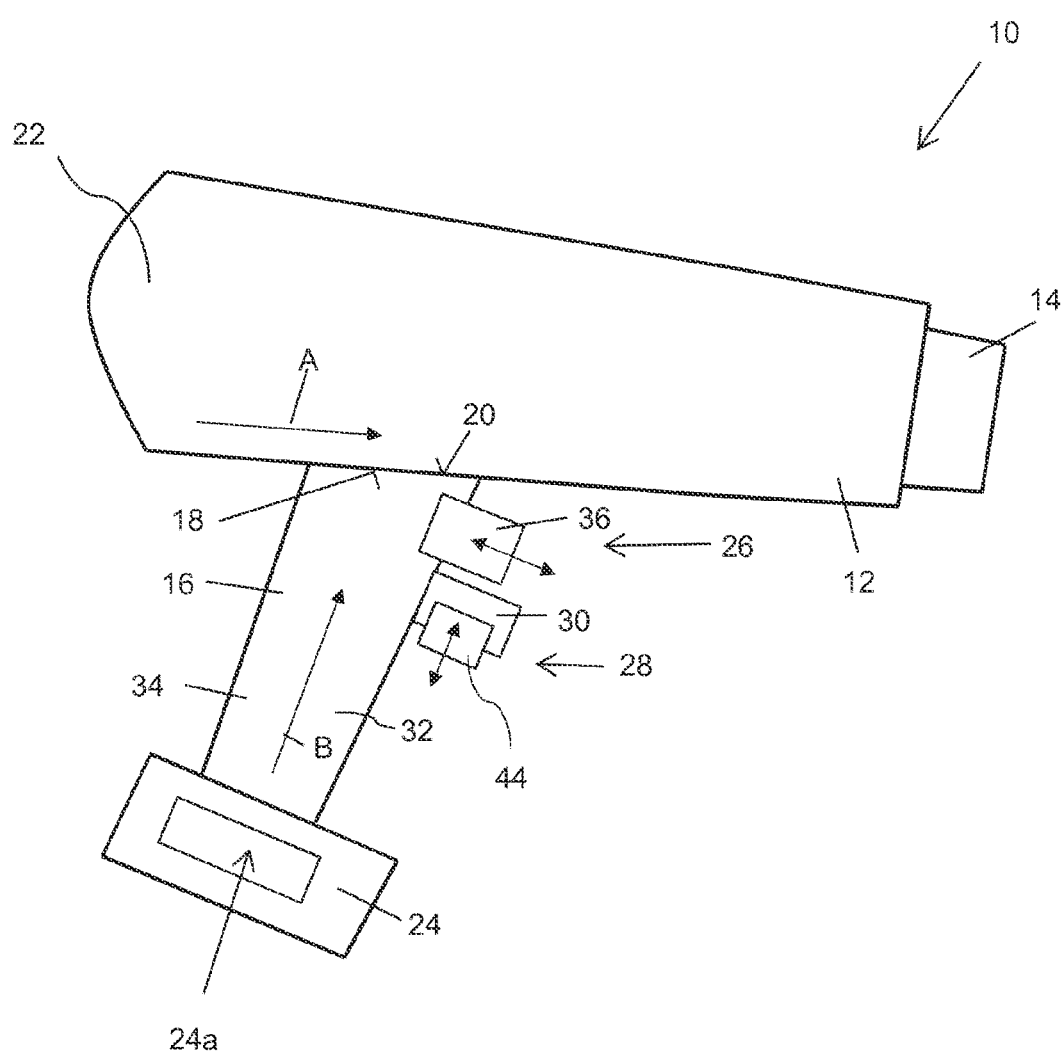
FIG. 1 shows a schematic view of an electrical, pistol-like handheld tool according to an exemplary embodiment of the invention.

In the various figures of the drawings, components corresponding to one another are provided with the same reference numerals.

FIG. 1 shows a schematic and simplified view of an electrical, pistol-like and especially battery-operated handheld tool 10 according to an exemplary embodiment of the invention.

The handheld tool 10 depicted in FIG. 1 has a tool body 12, by means of which a workpiece can be machined in an electrically activated manner. In this process, the invention is not limited to the use of the electrical, pistol-like handheld tool as a hot air gun (as will be described in more detail with reference to FIG. 6), but can provide a variety of uses. For example, it is possible that the electrical, pistol-like handheld tool according to the invention is a cordless screwdriver, a drill (battery-operated or wired), a hot glue gun, a milling device, a soldering device, a welding device, a stud welding device or generally a handheld tool which, due to dangerous operation, requires a locking mechanism or safety mechanism when machining a workpiece.

The tool body 12 is preferably provided as an elongated housing, where a workpiece machining area 14 can be provided on its front side or distal end of the tool body 12. For the exemplary embodiment shown in FIG. 6 as a hot air fan, this can, for example, be an air outlet for hot air. However, it is also conceivable that the workpiece machining area 14 is, for example, provided as a drill chuck in which a drilling tool can be accommodated. The elongated tool body 12 extends along a longitudinal direction A.

The handheld tool 10 also has a grip part 16 which is connected at an angle to the tool body 12. The grip part 16 extends along a grip axis B, so that the longitudinal direction A and the grip axis B are arranged at an angle to one another so that they are at an angle of 70° to 110°, or 80° to 100°, or, in particular, substantially perpendicular to one another. The grip part 16 is therefore connected with its first top end 18 to a rear bottom area 20 of the tool body 12. Even if the pistol-like handheld tool 10 can be held in different positions to the direction of gravity during a machining process, the terms "top" and "bottom" refer to a position of the handheld tool 10, in which the grip part 16 is aligned with its grip axis B substantially parallel to the direction of gravity, with the tool body 12 being arranged above the grip part 16. In this process, the longitudinal direction A of the tool body 12 runs substantially perpendicular to the direction of gravity and substantially parallel to a horizontal line. Furthermore, a front area of the handheld device 10 coincides with the workpiece machining area 14, and a rear area or reverse-side area 22 of the tool body 12 coincides with an area, in which the grip part 16 is provided and which faces a user.

The unlocking of the handheld device 10 according to the invention is supported in a particularly advantageous manner by the provision of a battery module 24, which can be detachably connected to the grip part 16 on its second bottom end facing away from the tool body 12 and is provided for supplying the handheld device 10 with electrical energy. The battery module 24 is, in a known manner, mounted or locked in place on the underside of the pistol-shaped grip part 16 of the handgrip 10.

The battery module 24 has electrical storage means 24a, which are preferably configured as electrical batteries. In this process, a lithium-ion battery can be provided as the electric battery 24a, which can be set to an operating voltage of 18V. By providing the battery module 24 as a power supply, operating powers for the handheld tool 10 in the range from 600 W to 1200 W can be provided. By providing the battery module 24 on the underside of the grip part 16, the grip part 16 aligns itself with its grip axis B in a plumb manner, i.e. parallel to the direction of gravity, which enables or at least facilitates the unlocking of the handheld device 10 according to the invention described in the following text.

For example, the electrical, pistol-like handheld tool 10 has an actuating device 26 for manually activating and/or deactivating the handheld tool 10, which actuating device 26 can be arranged on the tool body 12 or the grip part 16. In the exemplary embodiment shown in FIG. 1, the actuating device 26 is arranged on the grip part 16, but it is also conceivable that the actuating device 26 is provided on the tool body 12.

Furthermore, in accordance with the invention, the handheld tool 10 has an unlocking device 28 by means of which the actuating device 26 can be manually unlocked and/or locked. As, for example, shown in FIG. 1, the unlocking device 28 is, in accordance with the invention, arranged on the tool body 12 or the grip part 16 such that unlocking is effected by supporting the handheld tool 12 in a stable equilibrium on one of the fingers of a user's hand (not shown) when a user grips the grip part 16. In accordance with the invention, the weight distribution of the handheld tool 10 is therefore such that, due to the weight of the battery module 24 when a user grips the grip part 16 with a user's hand, one of the fingers of the user's hand, for example, the middle finger on the grip part 16, slides upward and, in this process, strikes the unlocking device 28, whereby, when the handheld tool 10 is grasped, unlocking of the handheld tool 10 is triggered. In a particularly advantageous manner, the handheld tool 10 is balanced in a stable equilibrium with the unlocking device 28 on one of the fingers of the user's hand and is carried or supported in equilibrium by this finger, with the unlocking device 28 being actuated by the corresponding supporting force.

Figure 4:
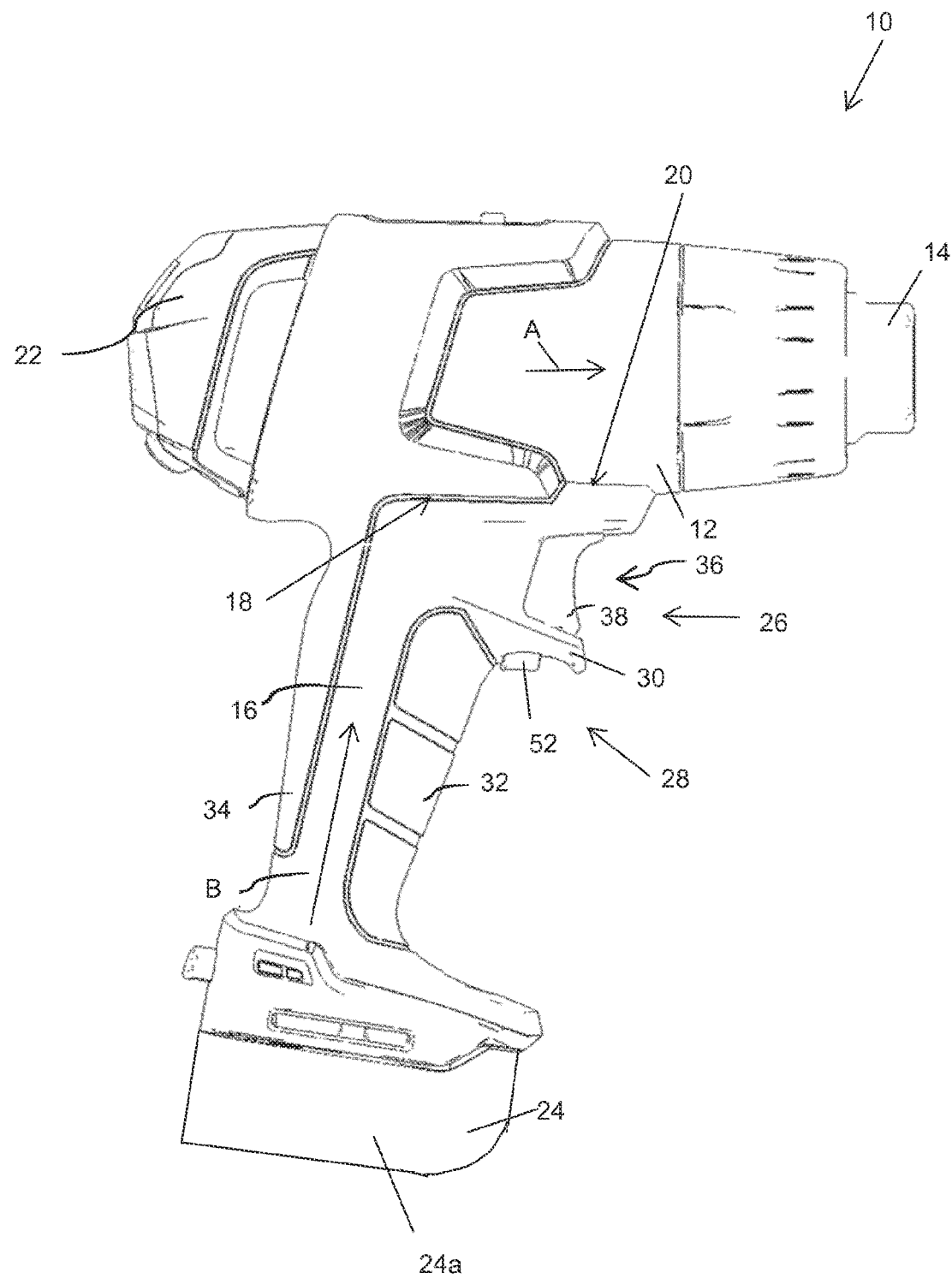
FIG. 4 shows a schematic perspective view of a handheld tool according to an exemplary embodiment of the invention.

According to another advantageous exemplary embodiment of the invention, the handheld tool 10 has a support mandrel 30, which projects from a finger grip area 32 of the grip part 16 forward, i.e. in the direction of the workpiece machining area 14 of the handheld tool 10, and includes on its underside, i.e. the side facing the battery module 24, the unlocking device 28, with unlocking being effected by supporting the support mandrel 30 on one of the fingers of the user's hand. As can, for example, be seen in the perspective view of the grip part 16 in FIG. 4, the support mandrel 30 can be configured as a curved protrusion, concave on its underside for an at least partially enclosing accommodation of the unlocking finger against the direction of gravity. The finger grip area 32 of the grip part 16 is an area in which the fingers of a user's hand come to rest when the handheld tool 10 is used. This finger grip area 32 lies on the opposite side of a finger grip area 34 of the grip part 16. As can be further seen from FIG. 4, the crescent-shaped support mandrel 30 prevents the handheld tool 10 from slipping from the unlocking finger, on which the handgrip 10, balanced in a stable equilibrium, comes to rest when gripped. Furthermore, the support mandrel 30 can be provided on the grip part 16 such that the actuating device 26, in particular, a pushbutton, is arranged between the tool body 12 and the support mandrel 30. Thus, it is ensured that unintentional actuation by a user's index finger is not made difficult or prevented even when unlocking.

The technical term "unlocking device" is to be understood quite generally to the effect that any type of actuation of the unlocking device 28 cancels locking of the actuating device 26. This unlocking of the actuating device 26 can, for example, be effected electrically by providing pushbuttons for the actuating device 26 and the unlocking device (as shown in FIG. 1), electronically by providing contact sensors (as, for example, shown in FIG. 2) or mechanically by providing an unlocking mechanism (as, for example, shown in FIG. 3 and FIG. 5). The unlocking device 28 can thus also be referred to as an unlocking unit, switch-on blocking unit, or simply as a blocking unit.

According to the exemplary embodiment in FIG. 1, the actuating device 26 comprises an electrical actuation pushbutton 36 which is actuated by an activating force against a restoring force transversely to the grip axis B of the grip part 16 by one of the fingers of the user's hand. In this process, the actuating device 26 is advantageously provided on the grip part 16 or the tool body 12 such that actuation is effected by means of an index finger of the user's hand.

Figure 5:
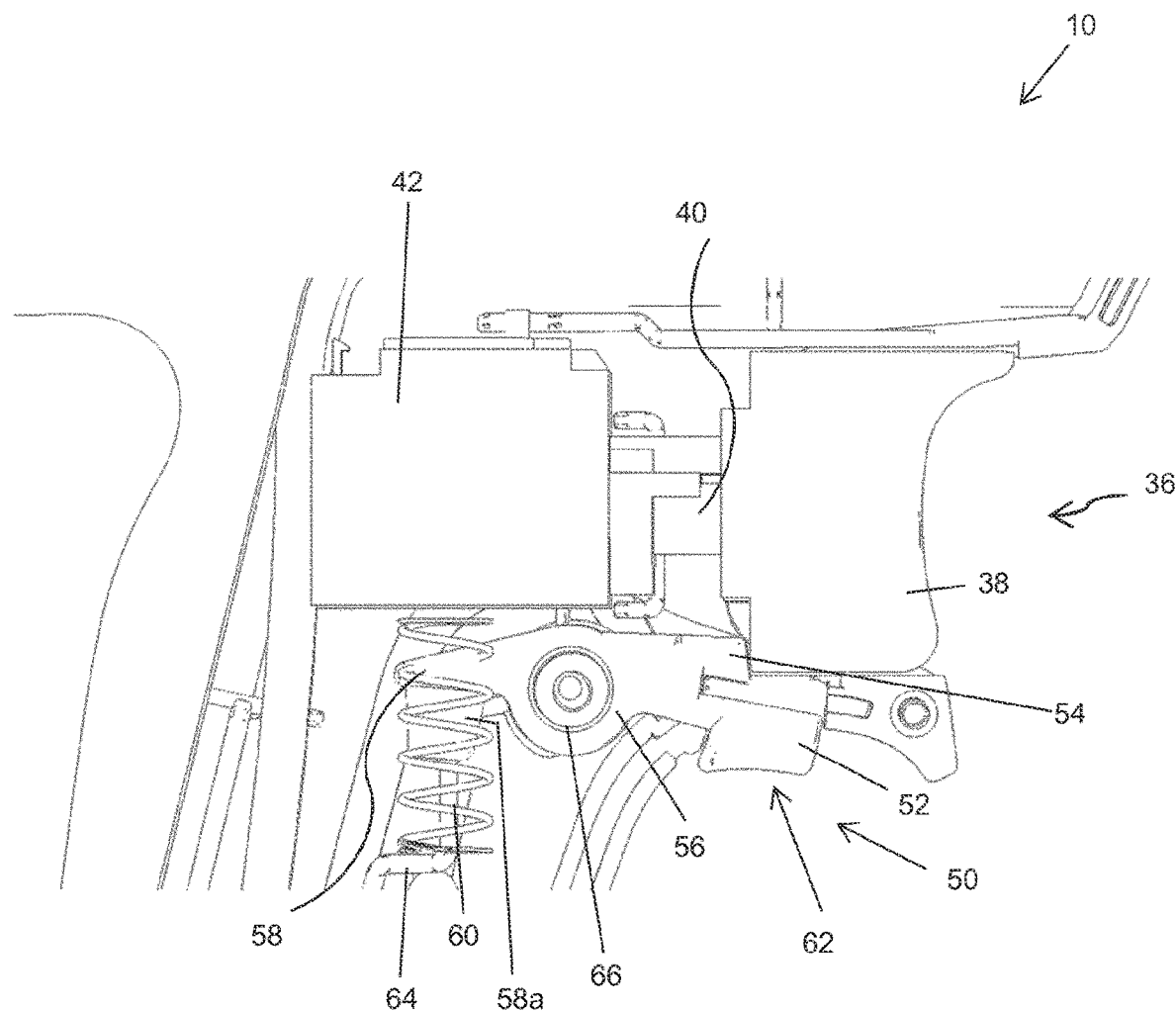
FIG. 5 shows a schematic view of a mechanical unlocking mechanism and an actuating device according to an exemplary embodiment of the invention.

The electrical actuation pushbutton 36 is shown in more detail in FIG. 5. Thus, the actuation pushbutton 36 has a pushbutton element 38 which is connected to an actuation switching unit 42 via a piston element 40 and is linearly guided through the piston element 40 between an off position and an on position. In other words, by pressing the button element 38, the piston element 40 is guided into the switching unit 42 and there triggers an electrical switching process or, depending on a gradual depression depth, a potentiometer process. The piston element 40 is moved contrary to the button depression direction, for example, by a return spring, into an off position and held in this position.

In the exemplary embodiment shown in FIG. 1, the unlocking device 28 comprises an electrical unlocking pushbutton 44 which is actuated by a supporting force against gravity along the grip axis B of the grip part 16 by one of the fingers of the user's hand. In this process, the unlocking device 28 is provided on the grip part 16 or the tool body 12 in a particularly advantageous manner such that unlocking is effected by means of a middle finger of the user's hand.

The electrical unlocking pushbutton 44 can be configured similarly as the electrical actuation pushbutton 36. In this exemplary embodiment according to FIG. 1, the actuating device 26 is unlocked or released, for example, by a series connection of the actuation pushbutton 36 and of the unlocking pushbutton 44, with the unlocking pushbutton being held in a "normally-off" or normally open contact position by a return spring and, when actuated, closes the power circuit for operating the handheld tool 10 whilst the actuation pushbutton 36 is held down at the same time.

Figure 2:
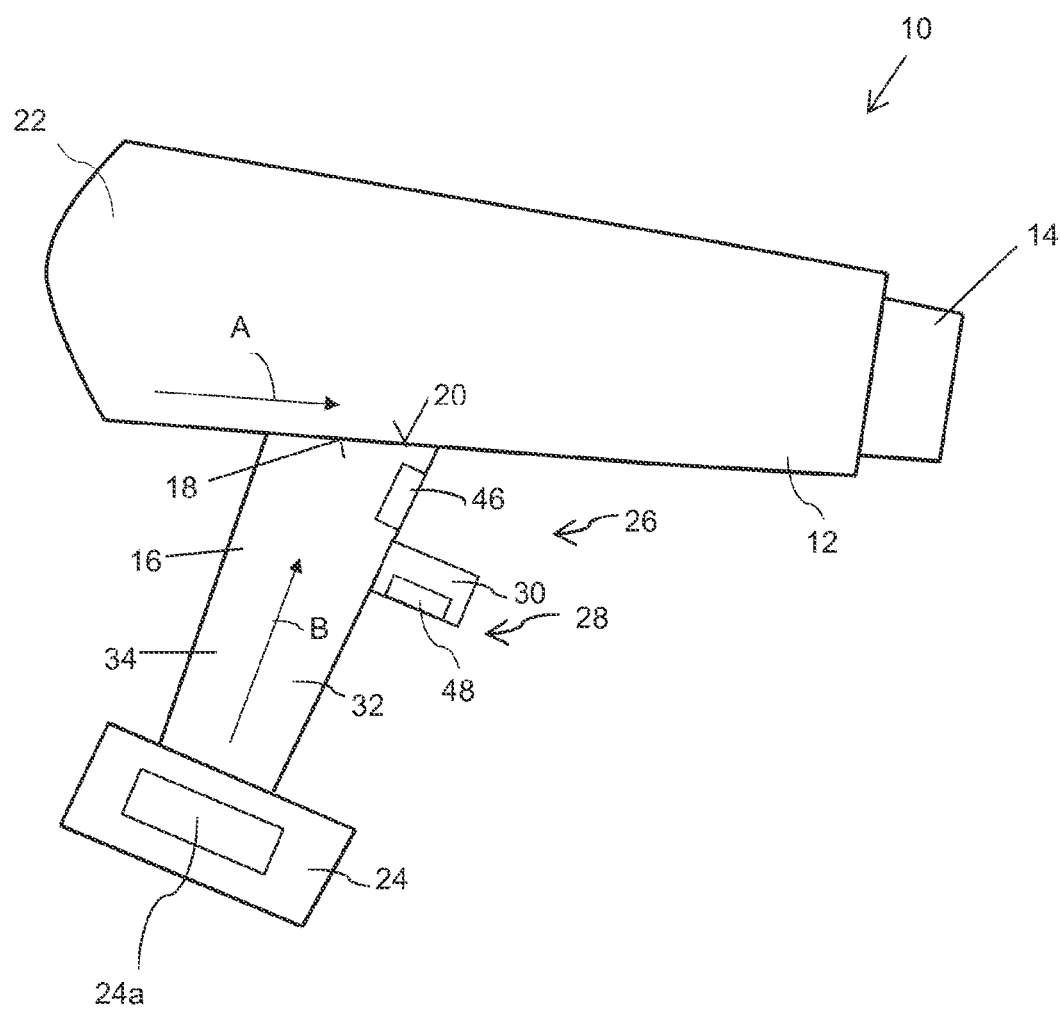
FIG. 2 shows a schematic view of a handheld tool according to another exemplary embodiment of the invention.

FIG. 2 shows another exemplary embodiment of a handheld tool 10 according to the invention. The actuating device 26 comprises an actuation contact sensor 46 which is actuated by a contact of the actuation contact sensor 46 in a direction transverse to the grip axis B of the grip part 16 by one of the fingers of the user's hand. Instead of an actuation contact sensor 46, however, also an actuation pushbutton 36, as shown in FIG. 1 and FIG. 5, can be used for the actuating device 26 for the handheld tool 10 from FIG. 2.

In FIG. 2, actuation is effected again by an index finger and unlocking by a middle finger. The invention, however, is not meant to be restricted to this embodiment, but is particularly advantageous. The unlocking device 28 comprises an unlocking contact sensor 48, which is actuated by a contact of the unlocking contact sensor 48 in a direction along the grip axis B of the grip part 16 by one of the fingers of the user's hand. The unlocking or release of the actuating device 26 by the unlocking contact sensor 48 can be affected electronically, with an electronic control unit (not shown) detecting a contact of the unlocking contact sensor 48, for example, capacitively and, in the event of a contact event, releases or closes a power circuit which is connected in series with the actuating device 28 for the electrical operation of the handheld tool 10.

Figure 3:
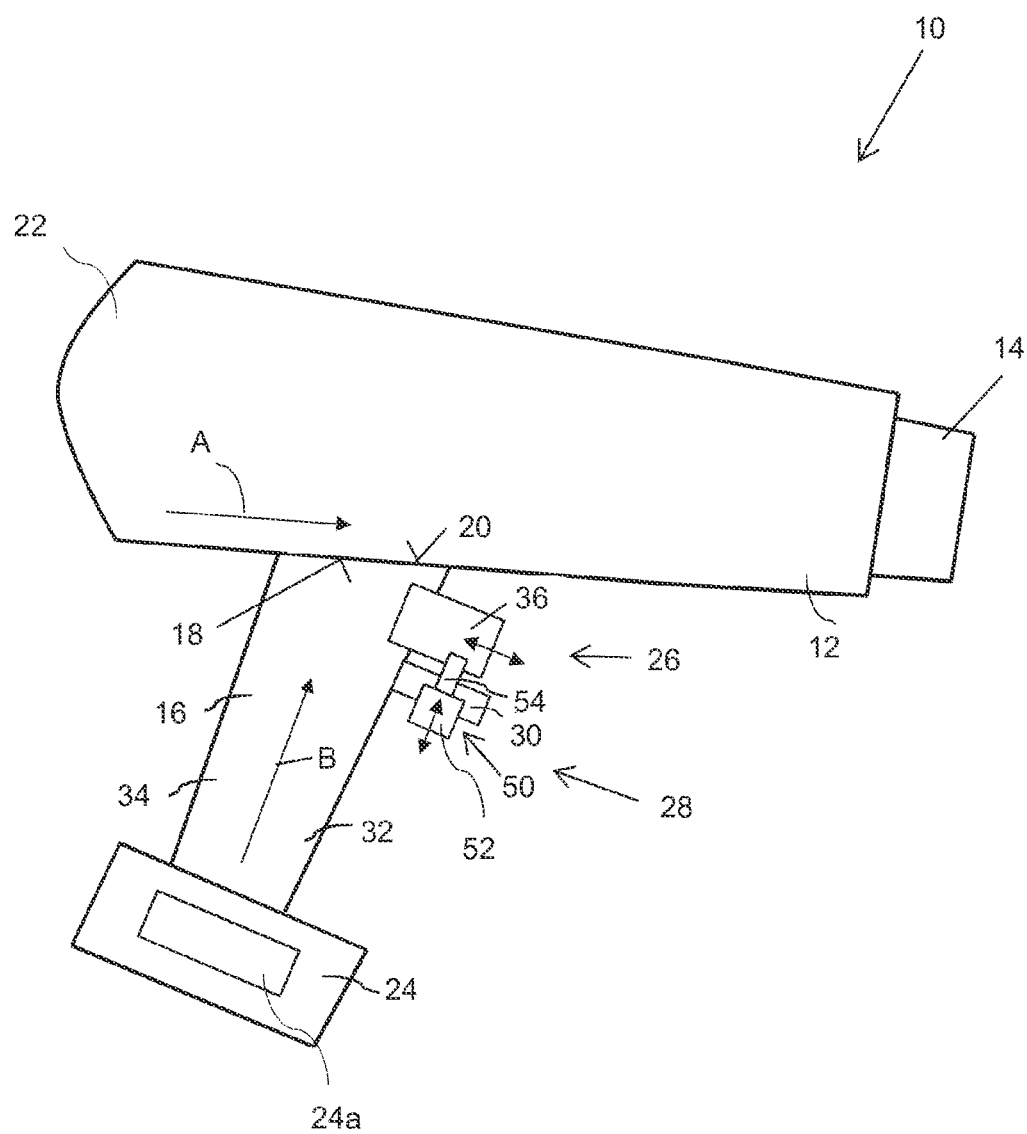
FIG. 3 shows a schematic view of a handheld tool according to still another exemplary embodiment of the invention.

Finally, a mechanical unlocking process is foreseen in FIG. 3. The unlocking device 28 comprises a mechanical unlocking mechanism 50 which mechanically unlocks or releases the actuating device 26 by a supporting force against gravity along the grip axis B of the grip part 16 by one of the fingers of the user's hand.

The mechanical unlocking mechanism 50 can block or lock an actuation pushbutton 36 in its actuation direction in different ways. For this purpose, the mechanical unlocking mechanism 50 can include a button area 52, which comes into contact with the unlocking finger, and a locking element 54, which, due to a frictional connection or form fit, detachably makes a movement of the actuation pushbutton more difficult or prevents it, or at least blocks such movement in the actuation direction so that actuation of the handheld tool 10 is prevented or at least made more difficult.

A particularly advantageous embodiment of the mechanical unlocking mechanism 50 is shown in FIG. 5. The mechanical unlocking mechanism 50 has an unlocking rocker 56 which is held in a locking position by a return spring 60 connected to its first end 58, with the second end 62 of the unlocking rocker 58 blocking actuation of the actuating device 26, or, in the exemplary embodiment shown in FIG. 5, of the actuation pushbutton 36.

The return spring 60 is configured as a compression spring which engages in an accommodating projection 58a of the first end 58 of the unlocking rocker 58 and is supported by a bottom area of a spring bearing 64 in the grip part 16. The pivot bearing 66 of the unlocking rocker 58 is also firmly connected to the grip part 16 such that the unlocking rocker 58 can pivot from a locking position into an unlocking position against the spring force of the return spring 60. For this purpose, the second end 62 of the unlocking rocker 58 is configured U-shaped, with a rear edge area of the pushbutton part 38 of the actuating device 26 being centrally guided within the U-shaped end 62 of the unlocking rocker 58 when unlocking, and the rear edge area of the pushbutton part 38, which is configured as an injection-molded hollow part, striking an edge area or the locking element 54 of the U-shaped end 62 of the unlocking rocker 58 when locking. The U-shaped end 62 of the unlocking rocker 58 is configured such that the pushbutton area 52 of the mechanical unlocking mechanism 50 is provided on one leg of the U-shaped end 62 and the locking element 54 of the mechanical unlocking mechanism 50 is provided on the other leg of the U-shaped end 62. When the unlocking rocker 58 is pivoted upward due to the unlocking force by one of the fingers of the user's hand, the locking element 54 is also pivoted upward, whereby the pushbutton element 38 of the actuation pushbutton, which is configured as a hollow part, is no longer blocked by the locking element 54 and can move freely in the actuation direction in the central area of the U-shaped end 62.

As can be taken from the entire FIGS. 1 to 6, both the actuating device 26 and the unlocking device 28 are completely symmetrical or mirror-symmetrical with respect to the plane spanned by the grip axis B and the longitudinal direction A. Thus, in accordance with the invention, the unlocking device 28 and the actuating device 26 are provided symmetrically or mirror-symmetrically on the grip part 16 or the tool body 12 such that unlocking or actuation can be carried out in the same manner by means of a user's right or left hand. Thus, the handheld tool 10 according to the invention can be used and unlocked in the same way by left-handers or right-handers, with no disadvantage arising when a user changes hands.

Thus, as shown in FIG. 5, mechanical locking of the on/off switch is provided. The mechanical blocking prevents unintentional actuation of the on/off switch and thus a start of the tool. The locking engages behind the housing of the on/off switch if it is not actuated. If it is actuated, the path is released, and the on/off switch can be pressed. If the on/off switch is pressed, the safety interlock need no longer be pressed, rather it is held in this position. The position of the safety interlock is selected such that the natural hand position on the handgrip already activates the safety interlock, but inadvertent actuation is made improbable. Thus, intuitive operation is enabled. Furthermore, a reliable mechanical block of the on/off switch by the unlocking mechanism 50, as shown in FIG. 5, is foreseen. In addition, it ensures smooth movement of the unlocking mechanism. In addition, the unlocking mechanism 50 has few mechanical components and is easy to assemble. Due to the easy assembly and the few, essentially two, mechanical components, the assembly and manufacture are cost-reduced, while the value in use of the handheld tool 10 is increased.

Figure 6:
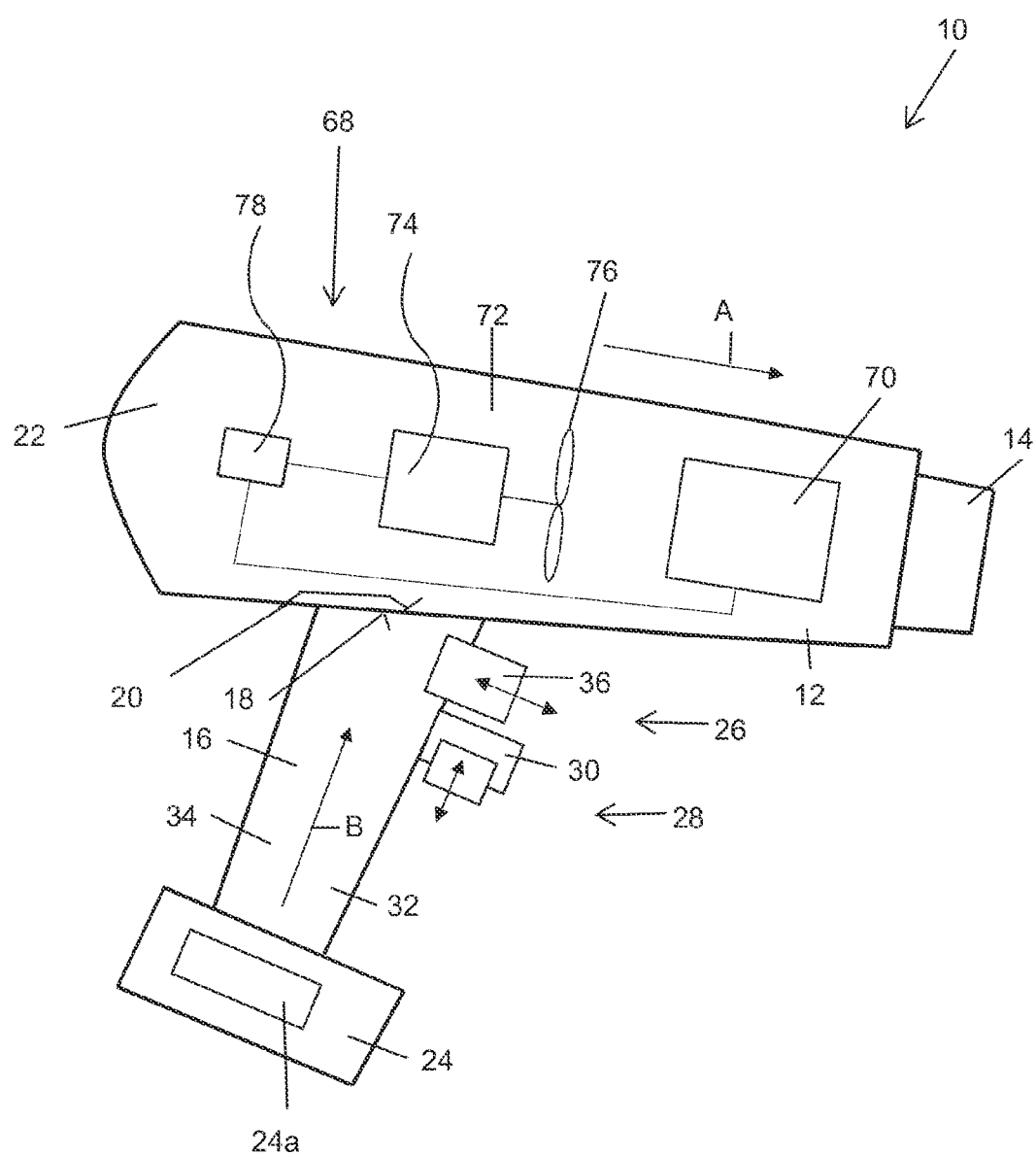
FIG. 6 shows a schematic view of a handheld tool configured as a hot air gun according to an exemplary embodiment of the invention.

FIG. 6 depicts a configuration of the handheld tool 10 as a hot air gun. For this purpose, the handheld tool 10 depicted in FIG. 6 has an elongated tool body 12 with a hot air fan 68, on which an air outlet for heated air is provided as the workpiece machining area 14.

This heated air is generated by a heating device 70, through which air is sucked in through an air inlet (not shown) by means of a fan device 72 and, heated to an operating temperature of up to ca. 700° C., can exit through the air outlet 14. In this process, the operating temperature is at 300° C. and 500° C.

To generate the airflow, the fan device 72 has an electric motor 74 and at least one fan propeller 76 capable of being driven by means of the electric motor 74. The electric motor 74 of the fan device 72 is configured as a brush motor. A schematically shown control unit 78 effects both temperature control and suitable control of the heating device 70 or of the fan device 72. The control unit 78 is electrically connected to the fan device 72 and to the heating device 70. The heating device 70 is configured to generate a constant heating output in a range between 300 W and 1,200 W, preferably in a range between 400 W and 600 W or between 800 W and 1,000 W, more preferably in ranges between 500 W and 600 W or 900 W and 1,000 W.

The additional operation of the handheld tool 10 configured as a hot air fan corresponds to the features already described with reference to FIGS. 1 to 5, where different actuation and unlocking mechanisms, as described above, can be freely combined with one another. For example, the exemplary embodiment shown in FIG. 2 is not restricted to the fact that a contact sensor must be provided both for actuation and for unlocking.

The invention claimed is:

1. An electrical, pistol-like handheld tool (10), comprising:
    a tool body (12) for electrically activated machining of a workpiece,
    a grip part (16) connected at an angle to the tool body (12),
    an actuating device (26) for manually activating and/or deactivating the handheld tool (10), which actuating device (26) is arranged on the tool body (12) or the grip part (16), and
    an unlocking device (28) for manually unlocking and/or locking the actuating device (26), wherein the unlocking device (28) is arranged on the tool body (12) or the grip part (16) such that unlocking is effected by supporting the handheld tool (10) in a stable equilibrium on one of the fingers of a user's hand when a user grips the grip part (16), and further comprising
    a support mandrel (30) which projects forward from the finger grip area (32) of the grip part (16) and includes the unlocking device (28) on its underside, with unlocking being effected by supporting the support mandrel (30) on one of the fingers of the user's hand.

2. The handheld tool (10) according to claim 1, wherein the support mandrel (30) is configured concave on its underside for an at least partially enclosing accommodation of the unlocking finger against the direction of gravity.

3. The handheld tool (10) according to claim 1, wherein the actuating device (26) comprises an electrical actuation pushbutton (36), which is actuated by an activating force against a restoring force transversely to a grip axis (B) of the grip part (16) by one of the fingers of the user's hand.

4. The handheld tool (10) according to claim 1, wherein the unlocking device (28) comprises an electrical unlocking pushbutton (44), which is actuated by a supporting force against gravity along a grip axis (B) of the grip part (16) by one of the fingers of the user's hand.

5. The handheld tool (10) according to claim 1, wherein the actuating device (26) comprises an actuation contact sensor (46), which is actuated by a contact of the actuation contact sensor (46) in a direction transverse to a grip axis (B) of the grip part (16) by one of the fingers of the user's hand.

6. The handheld tool (10) according to claim 1, wherein the unlocking device (28) comprises an unlocking contact sensor (48), which is actuated by a contact of the unlocking contact sensor (48) in a direction along a grip axis (B) of the grip part (16) by one of the fingers of the user's hand.

7. The handheld tool (10) according to claim 1, wherein the unlocking device (28) comprises a mechanical unlocking mechanism (50), which mechanically unlocks the actuating device (26) by a supporting force against gravity along the grip axis (B) of the grip part (16) by one of the fingers of the user's hand.

8. The handheld tool (10) according to claim 1, wherein the actuating device (26) is provided on the grip part (16) or the tool body (12) such that actuation is effected by means of an index finger of the user's hand.

9. The handheld tool (10) according to claim 1, wherein the unlocking device (28) is provided on the grip part (16) or the tool body (12) such that unlocking is effected by means of a middle finger of the user's hand.

10. The handheld tool (10) according to claim 1, wherein the unlocking device (28) and the actuating device (26) are provided symmetrically on the grip part (16) or the tool body (12) such that unlocking and actuation can be carried out in the same manner by means of a user's right or left hand.

11. The handheld tool (10) according to claim 1, wherein the grip part (16), on its bottom end facing away from the tool body (12), can be detachably connected to an electrical battery module (24) for supplying the handheld tool (10) with electrical energy.

12. The handheld tool (10) according to claim 1, wherein the tool body (12) includes a hot air fan (68).

13. An electrical, pistol-like handheld tool (10), comprising:
    a tool body (12) for electrically activated machining of a workpiece,
    a grip part (16) connected at an angle to the tool body (12),
    an actuating device (26) for manually activating and/or deactivating the handheld tool (10), which actuating device (26) is arranged on the tool body (12) or the grip part (16), and
    an unlocking device (28) for manually unlocking and/or locking the actuating device (26), wherein the unlocking device (28) is arranged on the tool body (12) or the grip part (16) such that unlocking is effected by supporting the handheld tool (10) in a stable equilibrium on one of the fingers of a user's hand when a user grips the grip part (16), wherein the unlocking device (28) comprises a mechanical unlocking mechanism (50), which mechanically unlocks the actuating device (26) by a supporting force against gravity along a grip axis (B) of the grip part (16) by one of the fingers of the user's hand, and wherein the mechanical unlocking mechanism (50) includes an unlocking rocker (56), which is held in a locking position by a return spring (60) connected to its first end (58), with the second end (62) of the unlocking rocker (58) blocking actuation of the actuating device (26).

14. The handheld tool (10) according to claim 13, further comprising:
    a support mandrel (30) which projects forward from the finger grip area (32) of the grip part (16) and includes the unlocking device (28) on its underside, with unlocking being effected by supporting the support mandrel (30) on one of the fingers of the user's hand.

15. The handheld tool (10) according to claim 13, wherein the second end (62) of the unlocking rocker (56) is configured U-shaped, and wherein, when unlocking, a pushbutton part (38) of the actuating device (26) is centrally guided within the U-shaped end (62) of the unlocking rocker (56) and, when locking, the pushbutton part (38) strikes a locking element (54) on the U-shaped end (62) of the unlocking rocker (56).

* * * * *